United States Patent [19]

Chen et al.

[11] Patent Number: 4,649,180

[45] Date of Patent: Mar. 10, 1987

[54] POLYAMIDE-POLY-CARBONATE BLOCK COPOLYMERS

[75] Inventors: Augustin T. Chen, Cheshire; Kemal Onder, North Haven, both of Conn.

[73] Assignee: The Dow Chemical Company, Midland, Mich.

[21] Appl. No.: 840,248

[22] Filed: Mar. 17, 1986

[51] Int. Cl.$^4$ .......................................... C08F 283/02
[52] U.S. Cl. ..................................... 525/462; 528/48; 528/51; 528/67; 528/84; 528/183; 528/288; 528/906
[58] Field of Search ............... 525/462; 528/288, 183, 528/48, 51, 67, 84, 906

[56] References Cited

U.S. PATENT DOCUMENTS

| | | | |
|---|---|---|---|
| 3,764,457 | 10/1973 | Chang et al. | 161/183 |
| 4,105,641 | 8/1978 | Buysch et al. | 526/712 |
| 4,129,715 | 12/1978 | Chen et al. | 528/67 |
| 4,131,731 | 12/1978 | Lai et al. | 528/370 |
| 4,328,331 | 5/1982 | Chen et al. | 528/288 |
| 4,388,455 | 6/1983 | Bales | 528/176 |

*Primary Examiner*—Lucille M. Phynes
*Attorney, Agent, or Firm*—J. S. Rose

[57] ABSTRACT

Substantially linear, segmented polyester-amides are disclosed which contain aromatic residues in the hard segments and as soft segments the residues of polycarbonate diols of molecular weight from about 400 to about 4000.

The polymers are characterized by the unexpected combination of excellent hydrolytic stability, thermal stability, and low temperature flexibility.

14 Claims, No Drawings

POLYAMIDE-POLY-CARBONATE BLOCK COPOLYMERS

FIELD OF THE INVENTION

This invention relates to polyester-amides and is more particularly concerned with polyester-amides having polycarbonate soft segments.

DESCRIPTION OF THE PRIOR ART

Segmented polyester-amides of the type described in U.S. Pat. No. 4,129,715 provided a significant advance over polyester-amides known up to that time. Significantly, it was found that aromatic residues could be introduced into the recurring units to improve polymer properties yet the polymer could still be easily injection molded. The soft segment components of these polyester-amides are comprised of residues derived from polymeric diols which latter can be either polyethers or polyesters having a molecular weight from about 400 to about 4000. While both types of polyester-amides are highly useful materials, unfortunately, those having the polyester based soft segment units enjoy good high temperature stability but poor hydrolytic stability, whereas the reverse set of properties holds true for those with polyether based soft segments. That is to say, if the polymer is employed in an application exposed to high temperature conditions the polyether based materials must be excluded. Conversely, humid conditions would exclude the use of the polyester based materials.

It has been found that when the polyether or polyester soft segments of the prior art polyester-amides of U.S. Pat. No. 4,129,715 are replaced by a polycarbonate residue, all of the beneficial properties of these polyester-amides are retained. Unexpectedly, the resulting polyester-amides have both good high temperature stability and hydrolytic stability combined. Furthermore, the polycarbonate based polymers are characterized by excellent low temperature flexibility.

SUMMARY OF THE INVENTION

This invention comprises substantially linear segmented thermoplastic polyester-amides characterized by the combination of excellent hydrolytic stability, thermal stability, and low temperature flexibility, said polyester-amides having a recurring unit of the formula (I) (see FORMULA CHART below) wherein Ar is an arylene radical, P is the residue of a precursor polycarbonate diol HOPOH having a molecular weight from about 400 to about 4000, B is the residue of a dicarboxylic acid HOOC—B—COOH selected from the class consisting of aliphatic dicarboxylic acids having 6 to 14 carbon atoms, inclusive, isophthalic, and terephthalic acids, m has a mean value of less than 1 and greater than 0, D is the residue of a dicarboxylic acid HOOC—D—COOH such that the melt temperature of the hard segment is not greater than about 325° C., and x is a number having an average value from 0 to 10.

The term "hydrolytic stability" means the ability of the polyester-amide to essentially retain its physical properties after exposure to the test conditions of 85° C. and 100 percent relative humidity for controlled periods of time in accordance with ASTM Test Procedure D-3137.

The term "thermal stability" means the ability of the polyester-amide to essentially retain its physical properties after exposure to the test conditions of 175° C. for 5 days in accordance with ASTM Test Procedure D-3045.

The term "low temperature flexibility" means the ability of the polyester-amide to maintain good flexibility even at low temperature test conditions of at least as low as −20° C. when tested by the Ross Flex test in accordance with ASTM Test Procedure D-1052.

The term "arylene radical" means a divalent arylene containing radical derived from an aromatic hydrocarbon having from 6 to 18 carbon atoms, inclusive, such as phenylene, tolylene, xylylene, naphthylene, diphenylylene, and radicals having the formula shown as Ar in the FORMULA CHART below wherein X is selected from the group consisting of —$SO_2$—, —CO—, —O—, and lower alkylene from $C_1$ to $C_4$, such as 4,4'-oxydiphenylene, 4,4'-sulfonyldiphenylene, 4,4'-carbonyldiphenylene, 4,4'-isopropylidenediphenylene, 4,4'-methylenediphenylene, 2,4'-methylenediphenylene, 3,3'-dimethyl-4,4'-methylenediphenylene, and the like, and mixtures thereof.

The term "residue of a precursor polycarbonate diol" means the residue after removal of the terminal hydroxyl groups of said diol which latter can be any polycarbonate diol characterized by the molecular weight range set forth above with terminal primary hydroxyl groups and having within its polymer chain polycarbonate linkages, i.e. —$ROCO_2$— wherein R is defined below.

The term "aliphatic dicarboxylic acids having from 6 to 14 carbon atoms" means the acids represented by the formula HOOC—$C_nH_{2n}$—COOH wherein the total number of carbon atoms, including those in the carboxylic groups, lies within the stated range and $C_nH_{2n}$ represents straight or branched chain alkylene having the appropriate carbon atom content. Illustrative of such acids are adipic, pimelic, suberic, azelaic, sebacic, 1,11-undecandioic and 1,12-dodecandioic, α-methyladipic, α,α-dimethyladipic, α-ethylpimelic, α-ethyl-α-methylpimelic, β,β'-diethyl-β,β'-dimethylsuberic, 2,2,4-trimethyladipic, 2,4,4-trimethyladipic, α,α-dimethylazelaic, and α,α,α',α'-tetramethylsebacic acids.

The dicarboxylic acid represented by the formula HOOC—D—COOH is a dicarboxylic acid or a mixture of two or more dicarboxylic acids the nature of which will be discussed in more detail hereinafter.

DETAILED DESCRIPTION OF THE INVENTION

The polyester-amides of the present invention are prepared identically to those disclosed in U.S. Pat. No. 4,129,715 using the same ingredients and procedures except for the polymeric diols which form the soft segment components of the resulting polymers. Accordingly, the disclosure and teaching of U.S. Pat. No. 4,129,715 is incorporated herein by reference in its entirety.

The novelty in this invention resides in the replacement of the polymeric diol defined under formula (III) of the incorporated patent by a polycarbonate diol HOPOH in order to have polycarbonate soft segments in the polymer recurring units of the polyester-amide.

Any linear polycarbonate diol meeting the definition set forth above can be used. Preferably the molecular weight range is from about 800 to about 2500. The various classes of polycarbonate diols meeting the above definitions are well known diols represented schematically in the formula (III) below wherein the divalent radical R can be alkylene of $C_2$ to $C_{25}$, cycloalkylene of $C_5$ to $C_8$, or arylene containing $C_6$ to $C_{18}$, and, for the most part, are commercially available materials. Generally speaking, the polycarbonate diols are solids at ambient room temperatures (i.e. 20° C.) ranging from low melting waxes to relatively high melting materials. Those diols wherein R is arylene such as phenylene, 4,4'-oxydiphenylene, 4,4'-isopropyldiphenylene, and the like have the highest softening ranges and are the least preferred; those wherein R are cycloalkylene, such as 1,3-cyclopentylene, 1,4-cyclohexylene, and the like, fuse at lower temperatures (90° C. and below); the diols wherein R is alkylene have the lowest melting ranges (below 60° C.) and are the preferred class. These preferred diols are referred to as aliphatic hydroxyl terminated polycarbonate diols. Most preferred within this class are those diols wherein alkylene is $C_4$ to $C_8$.

It will be readily understood by those skilled in the art that there are several well-known methods for the preparation of the polycarbonate diols. For example, the simple ester interchange reaction of diols butanediol, hexanediol, diethylene glycol and the like with glycol carbonates, according to U.S. Pat. No. 4,105,641 (the disclosure of which is incorporated herein by reference) will form polycarbonates containing the $-ROCO_2-$ recurring unit wherein R represents the alkylene residue of whatever diol was employed. When diols are reacted with phosgene, polycarbonates are formed with the evolution of hydrogen chloride. Further, the diols can be reacted with the bischloroformates of the same or different diols to form the polycarbonate having all the same or alternating R radicals as disclosed in U.S. Pat. No. 3,764,457, the disclosure of which relative thereto is incorporated herein by reference.

Alternatively, the polycarbonate diols can be prepared by the polyol initiated reaction of (1) carbon dioxide and 1,2-epoxides; (2) cyclic carbonates such as ethylene carbonate; or (3) cyclic carbonates and 1,2-epoxides, as disclosed in U.S. Pat. No. 3,764,457 whose disclosure relative thereto is incorporated herein by reference. The polycarbonate diols formed by these methods contain ether linkages in addition to the polycarbonate linkages.

In yet another and preferred method disclosed in U.S. Pat. No. 4,131,731, whose disclosure relative thereto is incorporated by reference herein, alkylene carbonates of 2 to 4 linear carbons are reacted with aliphatic or cycloaliphatic dihydroxyl compounds to form polycarbonate diols containing only minor amounts of ether linkages.

In accordance with the teaching of U.S. Pat. No. 4,129,715, the polycarbonate diol HOPOH is reacted in a first step with at least 2 molar proportions of the dicarboxylic acid HOOC—B—COOH (II) to form the carboxylic acid terminated polyester. Preferably, the proportion of (II) is in excess of 2 with a preferred range being about 2.1 to 2.4 moles per mole of polycarbonate diol. The reaction is carried out using the well-known method described in the aforesaid patent by azeotropically removing the water formed when the carboxylic acid and hydroxyl groups react in a solvent such as toluene, xylene, and the like.

The preferred dicarboxylic acids (II) are the aliphatic dicarboxylic acids having 6 to 14 carbons as defined above.

The carboxylic acid-terminated prepolymer obtained as described above is then reacted with the appropriate diisocyanate $Ar(NCO)_2$, wherein Ar is as hereinbefore defined, to form the polyester-amide characterized by the recurring unit (I) in which the value of x is 0. The prepolymer and the diisocyanate are employed in substantially equimolar quantities. Advantageously, but not necessarily, the reaction is carried out in the presence of an inert organic solvent in which the reactants are soluble. By "inert organic solvent" is meant an organic solvent which does not enter into reaction with any of the reactants or with the product and which does not interfere with the desired course of the reaction in any other way. Illustrative of inert organic solvents are tetramethylenesulfone, dichlorobenzene, monochlorobenzene, $\alpha$-butyrolactone, N-methylpyrrolidone, N,N-dimethylformamide, N,N-dimethylacetamide, xylene, and the like including mixtures of two or more such solvents.

The reaction between the prepolymer and the diisocyanate is carried out advantageously at elevated temperatures in the range of about 100° C. to about 250° C. and most advantageously in the range of about 150° C. to about 230° C. The reaction is assisted in most cases by the inclusion in the reaction mixture of a catalyst for the reaction between isocyanate and carboxylic acid groups. Any of the catalysts known in the art for this purpose can be employed such as the alkali metal alkoxides (as described in U.S. Pat. No. 4,001,186), the N-alkali metal lactamates (disclosed in U.S. Pat. No. 4,021,412), the phospholene-1-oxides or 1-sulfides (described in U.S. Pat. Nos. 2,663,737-8) and the phospholane-1-oxides or 1-sulfides (described in U.S. Pat. No. 2,663,739). A particularly preferred group of catalysts comprises 1,3-dimethyl-2-phospholene-1-oxide, 1,3-dimethyl-3-phospholene-1-oxide, 1-methyl-2-phospholene-1-oxide, 1-methyl-3-phospholene-1-oxide, and mixtures of any of these isomers.

The above catalysts are generally employed in amounts corresponding to about 0.001 percent to about 0.5 percent by weight of total reactants and preferably in amounts corresponding to about 0.02 percent to about 0.2 percent by weight of total reactants.

The progress of the reaction between the carboxylic acid-terminated prepolymer and the diisocyanate is readily followed by conventional techniques such as infrared or nuclear magnetic resonance spectroscopy. The end point of the reaction is determined by disappearance of absorption bands characteristic of the carboxylic acid group.

When the reaction is determined to be complete, by techniques such as those mentioned above, the desired polyester-amide can be recovered from the reaction mixture by pouring the latter into a solvent such as methanol, acetone, hexane, water, and the like in which the polymer is insoluble. The polymer generally precipitates in the form of strands which quickly solidify and which can be comminuted by any of the known techniques such as crushing, pelletizing and the like. The polymer, either before or after comminution, can be washed, if desired, with appropriate solvents and then dried using conventional procedures.

In a particular embodiment of the process of the invention there is included in the reaction mixture, in addition to the carboxylic acid-terminated prepolymer and diisocyanate, a dicarboxylic acid HOOC—D—COOH (IV) or a mixture of two or more such acids. Advantageously, the dicarboxylic acid (IV) is a straight chain aliphatic dicarboxylic acid having from about 6 to about 9 carbon atoms (inclusive of those in the carboxylic groups) but other dicarboxylic acids can be employed provided that the acids are such that the melt temperature of the hard section of the polymer into which the said acid is introduced is not raised thereby above about 325° C. Illustrative of dicarboxylic acids (IV) which can be employed in this embodiment are adipic, azelaic, sebacic, suberic, and trimethyladipic acids. Particularly preferred are azelaic and adipic as well as a mixture of approximately equimolar amounts of these two acids.

The proportion in which the dicarboxylic acid or mixture of acids (IV) is introduced into the polymers of the invention is advantageously not greater than about 10 moles per mole of prepolymer and preferably is in the range of about 0 mole to about 3 moles per mole of prepolymer. It is these molar ratios which dictate the average values of x set forth in formula (I). The amount of dicarboxylic acid (IV) introduced is such that the total weight of the hard segments (including the residue of the carboxylic acid groups derived from the carboxylic acid-terminated prepolymers) does not exceed 85 percent by weight of the total polymer and preferably the weight of the hard segment lies in the range of about 20 to about 60 percent by weight of the total polymer. As will be obvious to one skilled in the art, the proportion of diisocyanate employed in the reaction mixture is required to be increased, in proportion to the amount of dicarboxylic acid or acids (IV) which is introduced into the reaction mixture, in order to maintain the overall ratio of isocyanate groups to carboxylic acid groups in the range of 1:1.

In carrying out the embodiment of the invention in which the dicarboxylic acid (IV) is included as a reactant the procedure adopted is substantially the same as that described above for carrying out the reaction between the diisocyanate and the carboxylic acid-terminated prepolymer.

The diisocyanates Ar(NCO)$_2$ which are employed in preparing the polyester-amides of the invention are inclusive of 4,4'-methylenebis(phenyl isocyanate), 2,4'-methylenebis(phenyl isocyanate), 2,4-toluene diisocyanate, 2,6-toluene diisocyanate, and mixtures of any two or more of these diisocyanates. A preferred diisocyanate is 4,4'-methylenebis(phenyl isocyanate) alone or in admixture with up to 50 percent by weight of 2,4-toluene diisocyanate.

A particularly preferred class of linear segmented thermoplastic polyester-amides of this invention have the recurring unit (V) (see FORMULA CHART below) wherein P is the residue of a precursor aliphatic hydroxyl terminated polycarbonate diol defined above and having a molecular weight from about 400 to 4000, B is the residue of an aliphatic dicarboxylic acid having from 6 to 14 carbon atoms, inclusive, m has a mean value of less than 1 and greater than 0, D is the residue of a dicarboxylic acid (IV) defined above and x has an average value in the range of about 0 to 3.

The polyester-amides have melt temperatures of the order of 280° to 325° C. or less and are ideally suited for injection molding or compression molding.

Their unexpected combination of excellent hydrolytic stability, thermal stability, and low temperature flexibility, as discussed and defined above, make these polymers particularly useful for the manufacture of cable sheathing, tubing, and hose, which are exposed to wide ranges of temperature and humidity conditions; also they are useful as membrane materials used under conditions of relatively high temperature and humidity; and the like.

The following examples describe the manner and process of making and using the invention and set forth the best mode contemplated by the inventors of carrying out the invention but are not to be construed as limiting.

EXAMPLE 1

A. A 5 liter 3-necked flask was charged with 1412.4 g. (2.92 equiv.) of a linear aliphatic hydroxyl terminated polycarbonate diol wherein the aliphatic groups are hexamethylene radicals (EW=484, supplied as Duracarb-122 by PPG Industries, Chicago); 490.84 g. (6.72 equiv.) of adipic acid, 1000 ml. of xylene; and 1.4 g. of p-toluene sulfonic acid monohydrate. The stirred solution was brought to reflux and the formed water was continuously removed using a Dean-Stark trap. After about 8 hours the theoretical amount of water was collected. The reaction solution was then heated at about 160° C. under water pump pressure (about 10 mm. of mercury) to remove the xylene. There was thus obtained a carboxylic acid terminated prepolymer having an acid number (by titration) of 117.0 and corresponding to the formula

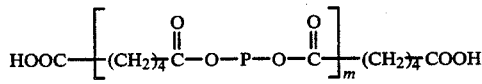

wherein P is the residue of the polycarbonate diol after removal of the terminal primary hydroxyl groups; m has an average value of 0.73.

B. A mixture of 384.4 g. (0.802 equiv.) of the prepolymer so obtained, 91.78 g. (0.962 equiv.) of azelaic acid, and 1600 ml. of tetramethylene sulfone (TMS) was heated to 225° C. (oil bath temperature) under nitrogen. To the hot solution was added 1.11 g. of 1,3-dimethylphospholene-1-oxide followed by the slow addition (over 2 hours) from an addition funnel of a solution comprising 218.90 g. of 4,4'-methylenebis(phenyl isocyanate) [MDI]dissolved in 250 ml. of TMS. This proportion of diisocyanate represented 98.5 percent of the theoretically required amount of 1.764 eq. A 50 ml. portion of TMS was used to rinse the addition funnel and the reaction solution heated at the above temperature for a 30 minute period. Then, three portions of 1 percent MDI and one of 0.5 percent were added at 30 minute intervals to make the final NCO index 102. The reaction solution was heated for another 2 hours at the above temperature.

The resulting reaction solution was poured into 5000 ml. of water causing the precipitation of the polymer product which was comminuted and washed again with water. It was then dried first in air, then in an air oven at 100° C.

There was thus obtained a polyester-amide A in accordance with the present invention having an inherent viscosity (0.5 g/100 ml. N-methylpyrrolidone at 30° C.) of 0.96 and having a recurring unit of the formula:

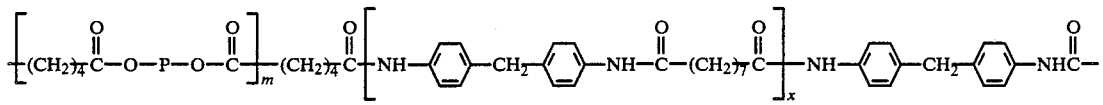

where x has an average value of 0.96 and m and P have the significance defined in Part A above.

A sample of the polymer was extruded as strands (⅛" diameter) using a Brabender vented extruder fitted with a screw of L/D ratio of 24:1. The screw speed was 40 r.p.m. with temperature settings: zone 1=242° C.; zone 2=245° C.; zone 3=245° C.; and zone 4=247° C.; melt temperature at nozzle was 260° C. and torque was 500 m-g. The extruded strands were chopped, redried and injection molded using a Stubbe injection molding machine to form 5"×5"×1/16" plaques. Molding conditions were as follows: nozzle setting=9.0; injection pressure=850 psi; temperature settings both zone 1, and zone 2, 475° F.; mold temperature of 185° F. and molding cycle of injection fill of 12 seconds with a hold of 20 seconds.

One set of dumbbell shaped samples cut from the molded plaques in accordance with ASTM D-412 was subjected to humid aging conditions of 85° C. and 100 percent relative humidity in accordance with the test exposure conditions of ASTM D-3137. A second set of similar dumbbell shaped samples was subjected to dry heat aging conditions of 175° C. for 5 days in accordance with the test exposure conditions of ASTM D-3045.

Two samples of polyester-amides of the prior art (U.S. Pat. No. 4,129,715), Comparison sample PEA-1 and Comparison sample PEA-2 were also molded and cut into dumbbell samples. Both comparison samples were the same but prepared in different polymer preparations. They were similar to formula I above with B, D, and Ar being the residues of azelaic acid, azelaic acid, and 4,4'-methylenebis(phenylene) respectively but instead of a residue P of a polycarbonate diol the soft segment was the residue of 1000 MW poly(tetramethylene azelate). PEA-1 was exposed to the humid aging conditions described above while PEA-2 was exposed to the dry heat aging conditions. Polyester-amide samples of the prior art similar to formula I above but wherein the soft segment residues were derived from either polypropylene glycol residues or tetramethylene glycol residues degraded excessively under the dry heat aging conditions of ASTM D-3045 and could not be tested.

The physical properties of the polyester-amide A and Comparison PEA-1 both before and after exposure to the humid age test conditions are set forth in Table I. Similarly, the physical properties of the polymer of this invention and Comparison PEA-2 exposed to the dry heat age conditions are set forth in Table II.

Polymer A essentially retained its physical properties after exposure to the humid age conditions, whereas the polyester soft segment Comparison PEA-1 did not as evidenced by the data set forth in Table I. Polymer A also displayed stability equal to the polyester soft segment Comparison PEA-2 after being exposed to heat aging as set forth in the data comparison of Table II.

Annealing of Polymer A at 200° C. for 3 hours prior to exposure to humid aging conditions did not result in any benefit to the physical properties of the base polymer and thus had no real effect on the same polymer after humid aging.

TABLE I

| Samples exposed to humid aging for days indicated | A | | | PEA-1 | |
|---|---|---|---|---|---|
| | 0 days | 3 days | 7 days | 0 days | 7 days |
| Tensile Modulus (psi) | | | | | |
| 50% | 2280 | 2090 | 2220 | 1830 | 1840 |
| 100% | 2385 | 2350 | 2470 | 1990 | 1730 |
| 300% | — | — | — | 2740 | — |
| Tensile str. (psi)[1] | 3165 | 2770 | 2920 | 3190 | 1730 |
| Elongation (%)[1] | 270 | 240 | 270 | 357 | 100 |
| Tensile set (%)[2] | 81 | 40 | 50 | 68 | 20 |
| Change in vol. (%)[3] | — | −0.25 | 0.14 | — | — |
| Change in wt. (%)[3] | — | 0.46 | 0.82 | — | — |
| Hardness (Shore) | 97A | 95A | 95A | 94A | 91A |

Footnotes to Table I
[1] Tensile properties measured in accordance with ASTM Test Method D412.
[2] Tensile set, ASTM Test Method D412.
[3] Change in volume and weight; ASTM Test Method D471.

TABLE II

| Samples exposed to heat aging for days indicated | A | | PEA-2 | |
|---|---|---|---|---|
| | 0 days | 5 days | 0 days | 5 days |
| Tensile Modulus (psi) | | | | |
| 50% | 2280 | 2450 | 2430 | 2050 |
| 100% | 2385 | 2700 | 2800 | 2415 |
| 300% | — | — | 3825 | — |
| Tensile str. (psi) | 3165 | 3330 | 3825 | 3620 |
| Elongation (%) | 270 | 250 | 300 | 265 |
| Tensile set (%) | 81 | 84 | — | — |
| Hardness (Shore) | 97A | 93A | 94A | — |

EXAMPLE 2

A. Using the same procedure and apparatus set forth in Example 1, Part A above, 2014.2 g. (4.684 equiv.) of a linear aliphatic hydroxyl terminated polycarbonate diol wherein the aliphatic groups are hexamethylene radicals (EW=430, supplied as Permanol KM-10-1733 by Beatrice Chemical Co., Peabody, Mass.); 1027.8 g. (10.77 equiv.) of azelaic acid, 1100 ml. of xylene, and 2.15 g. of p-toluene sulfonic acid were heated to reflux and the water formed was removed by the Dean-Stark trap. The theoretical amount of water was removed over a 4 hour period and heating continued for 4 hours. Solvent was removed at about 120° C. under about 10 mm. mercury pressure. There was obtained a carboxylic acid terminated prepolymer having an acid number (by titration) of about 100 and corresponding to the formula

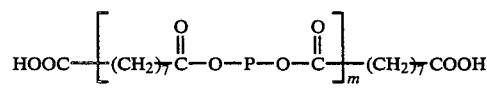

wherein P is the residue of the polycarbonate diol after removal of the terminal primary hydroxyl groups; m has an average value of 0.89.

B. Using the same procedure set forth in Example 1, Part B above a mixture of 514.68 g. (0.919 equiv.) of the prepolymer so obtained, 57.30 g. (0.784 equiv.) of adipic acid, and 1500 ml. of TMS was heated to 225° C. under nitrogen. To the hot solution was added 1.07 g. of 1,3-dimethylphospholene-1-oxide followed by the slow addition (over 2 hours) of a solution of 211.05 g. of MDI dissolved in 250 ml. of distilled TMS. This was 98.5 percent of the theoretical requirement of 1.7 equiv. Heating was continued for 1 hour. Then 5×1 percent and 1×0.5 percent portions of MDI were added at 30 minute intervals to make the final NCO index 104. The reaction solution was heated for a further 1 hour period.

The reaction solution was poured into water and the resultant polymer isolated as described in Example 1. There was thus obtained a polyester-amide B in accordance with the present invention having an inherent viscosity (0.5 g/100 ml. N-methyl-pyrrolidone at 30° C.) of 0.76 and having a recurring unit of formula:

Sample B. However, as seen in Table III below the PEA-3 could not go beyond 3 days of test exposure while PEEA-1 was measured up to the 7 day interval. The test results are set forth in Table III with the percent property retention shown in parenthesis.

Sample B retained essentially all of its tensile properties over the 14 day test period. Comparison PEA-3 showed marked property losses after 3 days.

TABLE III

| Samples exposed to humid aging for days indicated | B | | | | PEA-3 | PEEA-1 | |
|---|---|---|---|---|---|---|---|
| | 3 days | 7 days | 10 days | 14 days | 3 days | 3 days | 7 days |
| Tensile Modulus (MPa) | | | | | | | |
| 50% | 10.1 (100) | 9.3 (92) | 10 (99) | 10.6 (104) | 10.1 (80) | 10.9 (100) | 10.3 (95) |
| 100% | 13.1 (98) | 12.3 (91) | 13.2 (98) | 14.3 (106) | 13.7 (84) | 14.1 (104) | 14.8 (105) |
| 300% | 18.8 (100) | 18.8 (100) | 19.2 (102) | 18.2 (97) | 20.4 (71) | — | — |
| Tensile str. (MPa) | 21.5 (104) | 20.6 (100) | 20.6 (100) | 19.9 (97) | 22.9 (74) | 18.0 (101) | 18.8 (105) |
| Elongation (%) | 320 (114) | 360 (129) | 370 (132) | 360 (93) | 455 (123) | 200 (100) | 190 (95) |
| Change in vol. (%) | −0.05 | −0.02 | +0.70 | +0.28 | +0.30 | −0.30 | −0.33 |

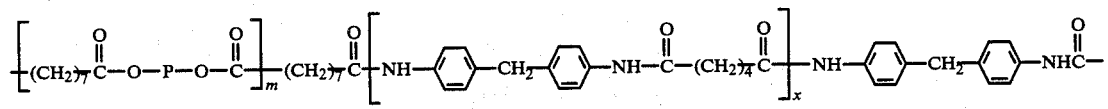

where x has an average value of 0.78 and m and P have the significance defined above.

The polyester-amide B was extruded, chopped, and injection molded into 5″×5″×1/16″ plaques using the procedures described above. The dumbbell samples cut from the plaques were subjected to the humid aging conditions of 85° C. and 100 percent relative humidity as described in Example 1 and tested after 3, 7, 10 and 14 day exposures to these conditions. The results of the tensile testing and change in volume are set forth in Table III with the percent retention of the individual property over the unaged sample shown in parenthesis.

A comparison polyester-amide (PEA-3) similar to PEA-1 and 2 of Example 1 above, and a comparison polyether polyester-amide (PEEA-1) with B, D, and Ar being the residues of azelaic acid, azelaic acid, and 4,4′-methylenebis(phenylene) respectively but instead of a residue p of a polycarbonate diol the soft segment was the residue of 1000 MW poly(propylene oxide) diol, were both prepared according to U.S. Pat. No. 4,129,715. These comparison polymers were both extruded and injection molded and cut into dumbbell samples using the procedures described in Example 1. They were to be tested at the same time intervals as

EXAMPLE 3

A. A 2 liter 3-necked flask was charged with 922.5 g. (0.910 equiv.) of a linear aliphatic hydroxyl terminated polycarbonate diol wherein the aliphatic groups are hexamethylene radicals (EW=1014, supplied as Permanol KM-10-1122 by Permuthane Co., Peabody, Mass.); 99.8 g. (1.046 equiv.) of azelaic acid, 76.45 g. (1.046 equiv.) of adipic acid, and 600 ml. of xylene; and 0.77 g. of p-toluene sulfonic acid monohydrate. The stirred solution was brought to reflux and the formed water was continuously removed using a Dean-Stark trap. After about 6 hours the theoretical amount of water was collected. The reaction solution was then heated at about 160° C. under water pump pressure (about 10 mm. of mercury) to remove the xylene. There was thus obtained a carboxylic acid terminated prepolymer having an acid number (by titration) of 55.0 and corresponding to the formula:

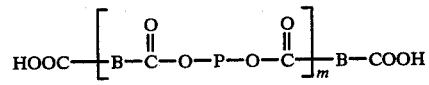

wherein P is the residue of the polycarbonate diol after removal of the terminal primary hydroxyl groups; m has an average value of 0.855; B in 50 percent of its occurrence is the residue of adipic acid and in the remaining 50 percent is the residue of azelaic acid.

B. A mixture of 343.11 g. (0.336 equiv.) of the prepolymer so obtained, 48.14 g. (0.505 equiv.) of azelaic acid, and 1000 ml. of tetramethylene sulfone (TMS) was heated to 225° C. (oil bath temperature) under nitrogen. To the hot solution was added 0.54 g. of 1,3-dimethyl-2- phospholene-1-oxide followed by the slow addition (over 2 hours) from an addition funnel of a solution comprising 105.96 g. of 4,4'-methylenebis(phenyl isocyanate) (MDI) dissolved in 300 ml. of TMS. A 50 ml. portion of TMS was used to rinse the addition funnel and the reaction solution heated at the above temperature for a 30 minute period. Then, four portions of 0.5 percent of MDI were added at 30 minute intervals to make the final NCO index 102. The reaction solution was heated for another 2 hours at the above temperature.

lar weight soft segment, sample C had very much higher flexing (at least 25x) over PEA-1.

TABLE IV

| Sample | A | C | PEA-1 |
|---|---|---|---|
| Number* of flexing cycles to failure: | | | |
| at −20° C. | $1.0 \times 10^5$ | $5.3 \times 10^5$ | $2.0 \times 10^4$ |
| at −40° C. | — | $4.0 \times 10^4$ | $2.5 \times 10^3$ |

*Each number represents the average of two separate tests which average was then rounded off to the nearest thousand.

FORMULA CHART

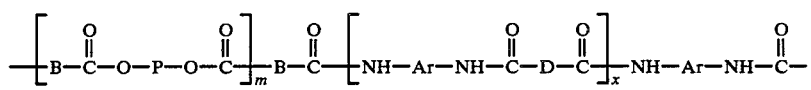
(I)

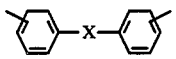

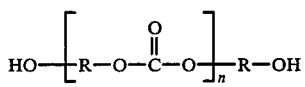
(III)

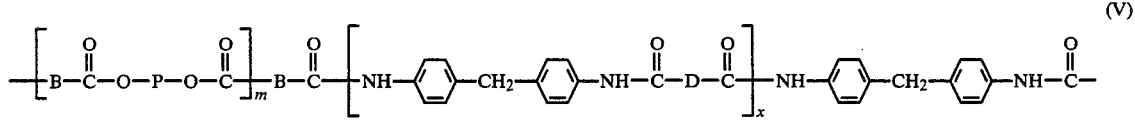
(V)

The resulting reaction solution was poured into 3000 ml. of water causing the precipitation of the polymer product which was comminuted and washed again with water. It was then dried first in air, then in air oven at 100° C. There was thus obtained a polyester-amide C in accordance with the present invention having an inherent viscosity (0.5 g/100 ml. N-methylpyrrolidinone at 30° C.) of 0.74 and having a recurring unit of formula:

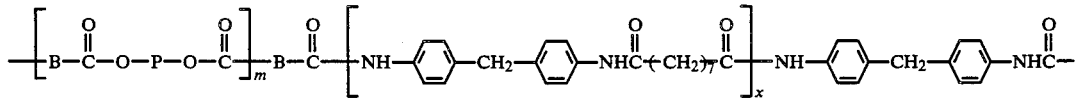

where x has an average value of 0.96 and m, P, and B have the significance defined above.

The polyester-amide C was extruded, chopped and injection molded into the 5"×5"×1/16" plaques using the procedure described above. One-inch wide samples were cut from the plaques as well as one-inch samples from the polyester-amide A and PEA-1 plaques of Example 1 above. The three sets of samples were subjected to low temperature flexibility testing in accordance with the Ross Flex Test, ASTM D1052. The results are set forth in Table IV.

The test was carried out by first making a ¼" wide slit in the middle of each sample and then continually flexing it in a test chamber held at either −20° C. or −40° C. in accordance with the test method until failure was noted. Polyester-amide A with its 1000 molecular weight polycarbonate soft segment can be fairly compared with comparison sample PEA-1 with its 1000 molecular weight polyester soft segment. The sample A had superior flex properties over PEA-1 at the −20° C. conditions as evidenced by its increased number of cycles (5x) before sample failure. At the higher molecular

We claim:
1. A substantially linear segmented thermoplastic polyester-amide characterized by the combination of excellent hydrolytic stability, thermal stability, and low temperature flexibility, said polyester-amide having a recurring unit of the formula:

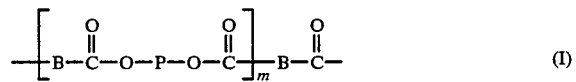
(I)

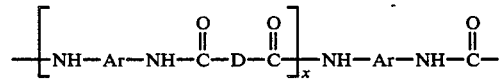

wherein Ar is an arylene radical, P is the residue of a precursor polycarbonate diol HOPOH having a molecular weight from about 400 to about 4000, B is the residue of a dicarboxylic acid HOOC—B—COOH selected from the class consisting of aliphatic dicarboxylic acids having 6 to 14 carbon atoms, inclusive, isophthalic, and terephthalic acids, m has a mean value of less than 1 and greater than 0, D is the residue of a dicarboxylic acid HOOC—D—COOH such that the melt temperature of the hard segment is not greater than about 325° C., and x is a number having an average value from 0 to 10.

2. A polyester-amide according to claim 1 wherein P is the residue of a precursor aliphatic hydroxyl terminated polycarbonate diol.

3. A polyester-amide according to claim 1 wherein the molecular weight of the precursor polycarbonate diol is from about 800 to about 2500.

4. A polyester-amide according to claim 1 wherein B is the residue of an aliphatic dicarboxylic acid having from 6 to 14 carbon atoms, inclusive.

5. A polyester-amide according to claim 4 wherein B is the residue of adipic acid.

6. A polyester-amide according to claim 4 wherein B is the residue of azelaic acid.

7. A polyester-amide according to claim 1 wherein D is the residue of adipic acid and x has an average value in the range of about 0 to about 3.

8. A polyester-amide according to claim 1 wherein D is the residue of azelaic acid and x has an average value in the range of about 0 to about 3.

9. A polyester-amide according to claim 1 wherein Ar represents 4,4'-methylenebis(phenylene).

10. A substantially linear segmented thermoplastic polyester-amide characterized by the combination of excellent hydrolytic stability, thermal stability, and low temperature flexibility said polyester-amide having a recurring unit of the formula:

wherein P is the residue of a precursor aliphatic hydroxyl terminated polycarbonate diol having a molecular weight from about 400 to about 4000, B is the residue of an aliphatic dicarboxylic acid having from 6 to 14 carbon atoms, inclusive, m has a mean value of less than 1 and greater than 0, D is the residue of a dicarboxylic acid HOOC—D—COOH such that the melt temperature of the hard segment is not greater than about 325° C., and x has an average value in the range of about 0 to 3.

11. A polyester-amide according to claim 10 wherein said aliphatic hydroxyl terminated polycarbonate diol has a molecular weight from about 800 to about 2500.

12. A polyester-amide according to claim 11 wherein B is the residue of adipic acid, D is the residue of azelaic acid and x has an average value of from about 0.5 to about 1.5.

13. A polyester-amide according to claim 11 wherein B is the residue of azelaic acid, D is the residue of adipic acid and x has an average value of from about 0.5 to about 1.0.

14. A polyester-amide according to claim 11 wherein B is the residue of azelaic acid in about 50 percent of its occurrence and adipic acid in its remaining occurrence, D is the residue of azelaic acid and x has an average value of from about 0.5 to about 1.5.

* * * * *

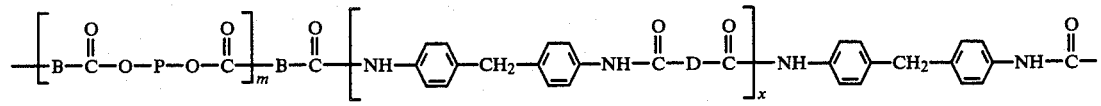

(V)